United States Patent

Mashata

[11] Patent Number: 5,315,759
[45] Date of Patent: May 31, 1994

[54] POWER-DRIVEN PIPE CUTTING DEVICE

[76] Inventor: Moshe Mashata, 9761 NW. 33 Manor, Sunrise, Fla. 33351

[21] Appl. No.: 86,537

[22] Filed: Jul. 1, 1993

[51] Int. Cl.[5] .................. B23D 21/08; B26D 3/16
[52] U.S. Cl. .................................. 30/97; 30/101; 30/102
[58] Field of Search .............. 30/92, 93, 94, 95, 96, 30/97, 101, 102

[56] References Cited

U.S. PATENT DOCUMENTS

| | | | |
|---|---|---|---|
| 2,195,568 | 4/1940 | Hexdall | 30/97 X |
| 3,651,569 | 3/1972 | Arnot | 30/95 |
| 4,305,205 | 12/1981 | Girala | 30/102 |
| 4,682,919 | 7/1987 | Mitchell | 409/179 |
| 4,769,911 | 9/1988 | Araki | 30/94 |
| 4,802,278 | 8/1989 | Vanderpol et al. | 30/97 |
| 4,831,732 | 5/1989 | Garton | 30/101 |
| 4,890,385 | 1/1990 | Vanderpol et al. | 30/101 |
| 5,099,577 | 3/1992 | Hutt | 30/101 |
| 5,206,996 | 5/1993 | McDaniel | 30/101 |

FOREIGN PATENT DOCUMENTS 2528340  12/1983  France ...................... 30/101

*Primary Examiner*—Eugenia Jones
*Assistant Examiner*—Raymond D. Woods
*Attorney, Agent, or Firm*—Herbert L. Lerner; Laurence A. Greenberg

[57] ABSTRACT

A pipe cutting device for cutting tubing and other cylindrical objects comprises a frame with a handle portion at one end thereof and an upper jaw portion at another end thereof. A cutting roller is rotatably supported in the upper jaw portion. A slide carriage is slidingly mounted on the frame and a power-driven roller is rotatably supported in the slide carriage. The slide carriage with the power-driven roller forms a lower jaw disposed opposite from the upper jaw, and the upper and lower jaws define a cutting space for receiving tubing or other cylindrical objects to be cut. The slide carriage is slid in a direction towards the upper jaw for narrowing the cutting space during a cutting operation. A power motor drives the power-driven roller.

8 Claims, 3 Drawing Sheets

POWER-DRIVEN PIPE CUTTING DEVICE

BACKGROUND OF THE INVENTION

1. Field of the Invention

The invention relates to tube cutting tools, and in particular to pipe cutting devices as generally used in the plumbing art.

2. Description of the Related Art

Tubing cutters of this general kind comprise a clamp with a U-type open end into which the tubing is inserted. One or two rollers support the tubing and bias the same against an oppositely disposed cutting roller. As the device is rotated about the longitudinal axis of the pipe, the cutting roller cuts into the material and thus severs the tubing.

U.S. Pat. No. 5,206,996 to McDaniel describes a tubing cutter with a single cutting roller and two biasing and guide rollers. The tubing is automatically retained within the triangular configuration formed by the two guide rollers and the cutting roller. The biasing force, with which the cutting roller is effectively forced into the tubing material, is provided by a spring.

U.S. Pat. No. 4,305,205 to Girala discloses a self-clamping cutting tool which, in one embodiment, is a power-driven pipe cutter. A cutting head is driven about the pipe axis by means of a power mechanism with a motor and a one-way ratchet mechanism. The device is quite complicated and thus expensive.

None of the prior art hand-held tubing and pipe cutters, except for Girala's, are fully automatic and completely power driven, i.e. they all require a certain amount of manual power application during the cutting operation.

SUMMARY OF THE INVENTION

It is accordingly an object of the invention to provide a power-driven pipe cutting device, which overcomes the hereinafore-mentioned disadvantages of the heretofore-known devices of this general type and which provides a fully automatic, power-driven tool which is much simpler in construction and use than the prior art devices.

With the foregoing and other objects in view there is provided, in accordance with the invention, a device for cutting tubing and other cylindrical objects, comprising:
- a frame having a handle portion at one end thereof and an upper jaw portion at another end thereof;
- a cutting roller rotatably supported in the upper jaw portion;
- a slide carriage slidingly mounted on the frame;
- a power-driven roller rotatably supported in the slide carriage;
- the slide carriage with the power-driven roller forming a lower jaw disposed opposite from the upper jaw; the upper and lower jaws defining a cutting space therebetween for receiving tubing or other cylindrical materials to be cut;
- means for sliding the slide carriage in a direction towards the upper jaw for narrowing the cutting space during a cutting operation; and
- power means for driving the power-driven roller.

In accordance with an added feature of the invention, the device includes a third, rotatably mounted roller, the cutting roller, the power-driven roller and the third roller being mutually oppositely disposed in a triangular configuration and forming a triangular clamping space therebetween. While it is possible to attain a triangular clamping of the pipe to be cut with two rollers (the cutting roller and the power-driven roller) in conjunction with the body frame, the three-roller configuration is preferable in that it provides smooth and easy rotation of the pipe.

In accordance with an additional feature of the invention, the third roller is a further cutting roller rotatably supported in the upper jaw portion. Two cutting rollers increase the cutting speed. This is especially desirable for metal tubing. It is also possible, of course, to provide only one cutting roller (as widely done in the prior art) and two other rollers. Both or only one of the other rollers are power-driven.

In accordance with a further feature of the invention, the sliding means include a threaded spindle operatively connected to and rotatably driven by the power means and an extension with gear teeth formed on the slide carriage, the gear teeth meshing with the threaded spindle for advancing the slide carriage upon a rotation of the threaded spindle.

In accordance with an alternative feature of the invention, the sliding means include a spring biasing the slide carriage with the power-driven roller in a direction towards the cutting roller.

In other words, the slide carriage may be forced towards the cutting roller by way of the power provided by the motor, i.e. through the spindle, or it may be biased into that direction by means of a spring.

In accordance with yet an added feature of the invention, the power means include a motor disposed in the handle portion, a spindle operatively connected to and rotatably driven by the motor, a gear wheel rigidly connected to the power-driven roller meshing with gear teeth provided on the spindle.

In accordance with yet another feature of the invention, the device includes means for allowing the cutting roller disposed in the upper jaw portion to resiliently retract upon a given force exerted thereon in a direction from the lower jaw. This embodiment of the invention is particularly advantageous in the context of the motor-assisted sliding of the slide carriage and in the cutting of metal objects. Should the carriage advance more quickly than the cutting rollers are able to cut into the material, a severe strain would be placed on the spindle-carriage connection. In order to alleviate that strain, the cutting rollers are allowed to move backwards against the action of a biasing spring.

With the above-noted and other objects in view, there is also provided, in accordance with the invention, a device for cutting tubing and other cylindrical objects, comprising a body; first and second jaw portions attached to the body and defining a cutting space therebetween for receiving tubing to be cut; one of the jaw portions being rigidly connected to the body and the other of the jaw portions being slidingly supported on the body opposite the first jaw portion; a cutting roller rotatably supported in the first jaw portion; a power-driven roller rotatably supported in the second jaw portion; means for sliding the other of the jaw portions in a direction towards the one jaw portion for narrowing the cutting space during a cutting operation; and power means for driving the power-driven roller.

Other features which are considered as characteristic for the invention are set forth in the appended claims.

Although the invention is illustrated and described herein as embodied in a power-driven pipe cutting device, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
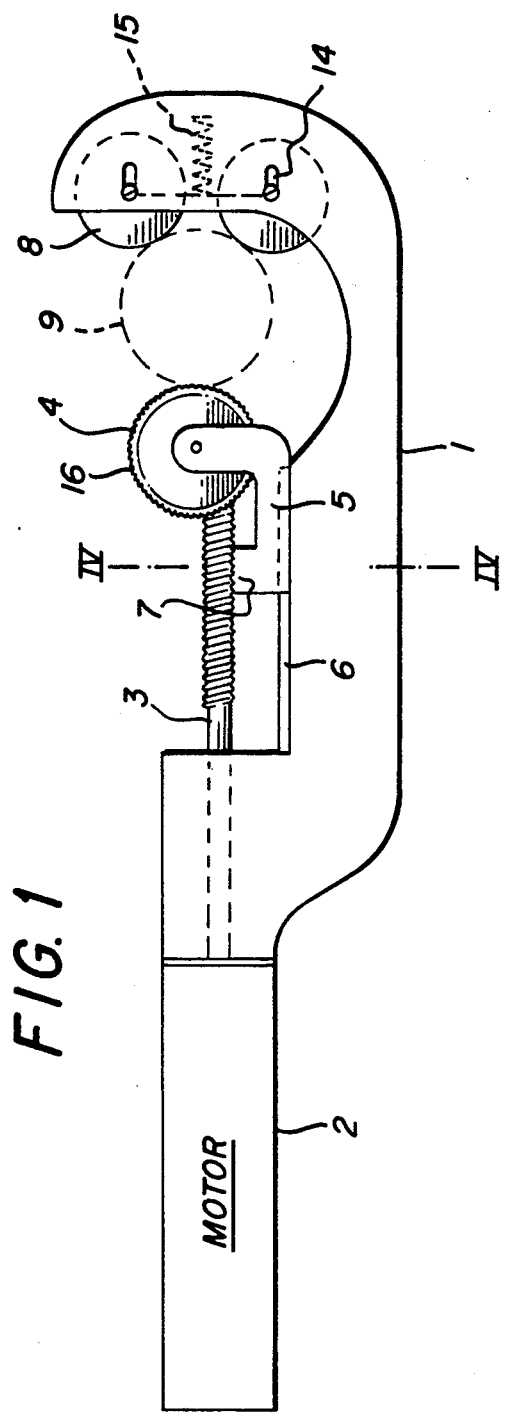
FIG. 1 is a side-elevational view of a power-driven pipe cutting device according to the invention.

Referring now to the figures of the drawing in detail and first, particularly, to FIG. 1 thereof, there is seen a pipe cutter according to the invention with a basic body or frame 1 with a handle 2 in which a motor is disposed. The motor drives a threaded spindle 3 which, in turn, drives a power roller 4. Cutting rollers 8 are rotatably supported in the frame 1. The cutting rollers 8 are disposed on an upper jaw portion opposite the power roller 4, with which they form a triangular configuration.

The power roller 4 is rotatably supported on a carriage 5 which slides on a rail 6. The carriage 5 with the power roller 4 forms a lower jaw, opposite the upper jaw portion of the frame 1. It is noted, in this context, that the terms "upper" and "lower" are used as visual aids only and do not denote any absolute position, but merely relative positions.

In the first embodiment, the carriage 5 is provided with an extension 7 with teeth which mesh with the thread on the spindle 3. A rotation of the spindle 3, therefore, causes the carriage 5 to slide on the rail 6 either towards or away from the cutting rollers 8. A pipe 9, indicated in dashed lines, is disposed within the triangle formed by the two cutting rollers 8 and the power roller 4.

Figure 3:
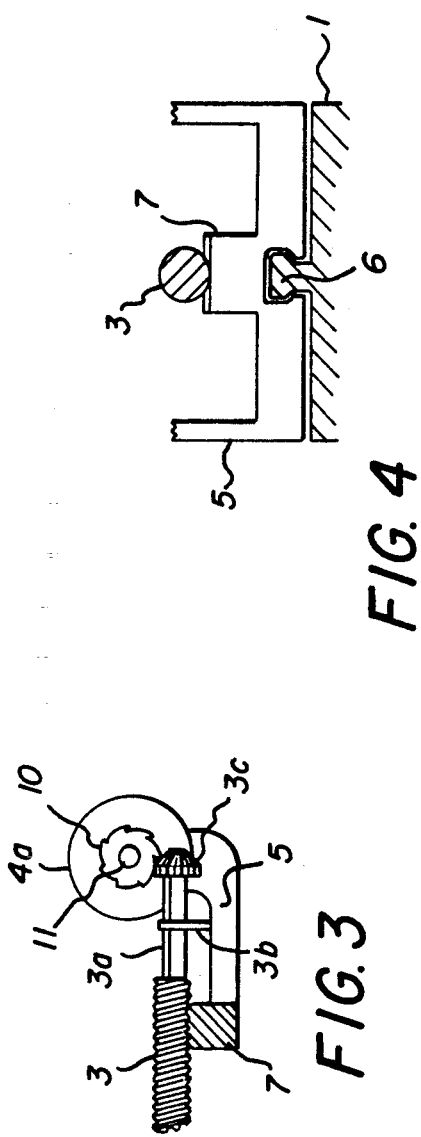
FIG. 3 is a cross-sectional view along a line III—III in FIG. 2 as viewed in the direction of the arrows.
Figure 2:
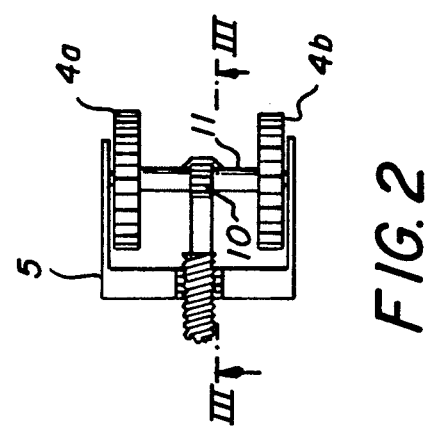
FIG. 2 is a partial, top-plan view of a power roller slide carriage with driven power rollers.

Referring now to FIGS. 2 and 3, the power roller 4 may be in the form of two wheels 4a and 4b which are symmetrically disposed relative to the spindle 3. A gear wheel 10, which is centrally located between the wheels 4a and 4b on an axle 11, meshes with the inclined threading on spindle head 3c. It is thus seen that a rotation of the spindle 3, besides slidingly moving the carriage 5, also causes the wheels 4a and 4b to rotate. The spindle 3, in this embodiment, is provided with a telescoping member 3a. The telescoping member 3a, for example of square cross-section, is allowed to slidingly move into and out of the threaded part of the spindle 3. The alignment of the spindle head 3c with the threaded axle 10 is ensured by means of a stop 3b. The connection between the telescoping members of the spindle may be within the carriage or it may be located in the handle. It is understood that the power-driven movement of the slide carriage may be embodied in several different ways and the illustrated embodiment is but one example.

Depending on the preferred use of the tubing cutter according to the invention, different ratios may be utilized for the rotation of the power roller 4 relative to the forced advance of the slide carriage 5. In plastic tubing such as PVC pipe, for example, the advance of the carriage 5 will be rather quick, because the cutting rollers 8 advance well into the material. Only two full rotations of the power roller 4, i.e. two rotations of the pipe 9, may suffice to sever the pipe. In the case of piping having a ⅛ inch wall thickness, this means that the carriage should advance ⅛ of one inch. With metal, on the other hand, the advance should be adjusted to a smaller value, as the cutting rollers 8 may dig into the metal by only small increments. The power drive and the gear ratios may be adjusted accordingly. In an effort to provide a certain amount of lee-way, the invention provides for the axles of the cutting rollers 8 to be mounted with a slight resilience. In this regard, the cutting rollers 8 are supported in oblong openings 14 in the frame 1 and a very strong spring 15 biases the rollers 8 against the pipe 9. The power rollers 4 may be provided with a peripheral friction surface 16, for instance a coating of hardened rubber or polyurethane. In the alternative, the friction surface 16 may be formed by a peripheral corrugation or by grooves formed into the peripheral surface of the roller(s) 4.

Figure 4:
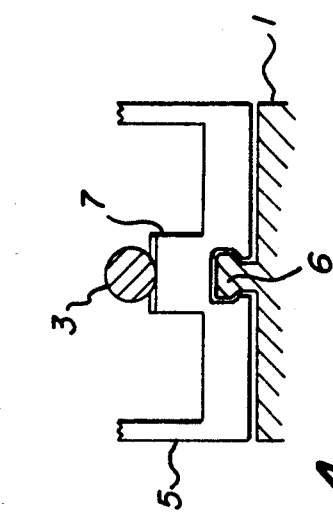
FIG. 4 is a partial, cross-sectional view of a slide carriage cut along the line IV—IV of FIG. 1.

Various kinds of sliding guides are known to the person skilled in the mechanical arts. One example is illustrated in FIG. 4, which shows a partial view of the slide configuration. The rail 6 has a T-shaped cross-section. The carriage 5 is provided with a mating opening, which, in the example, is provided centrally below the extension 7. Two rails, laterally disposed towards the sides of the frame 1, for instance, add mechanical stability and are thus a viable alternative.

Figure 5:
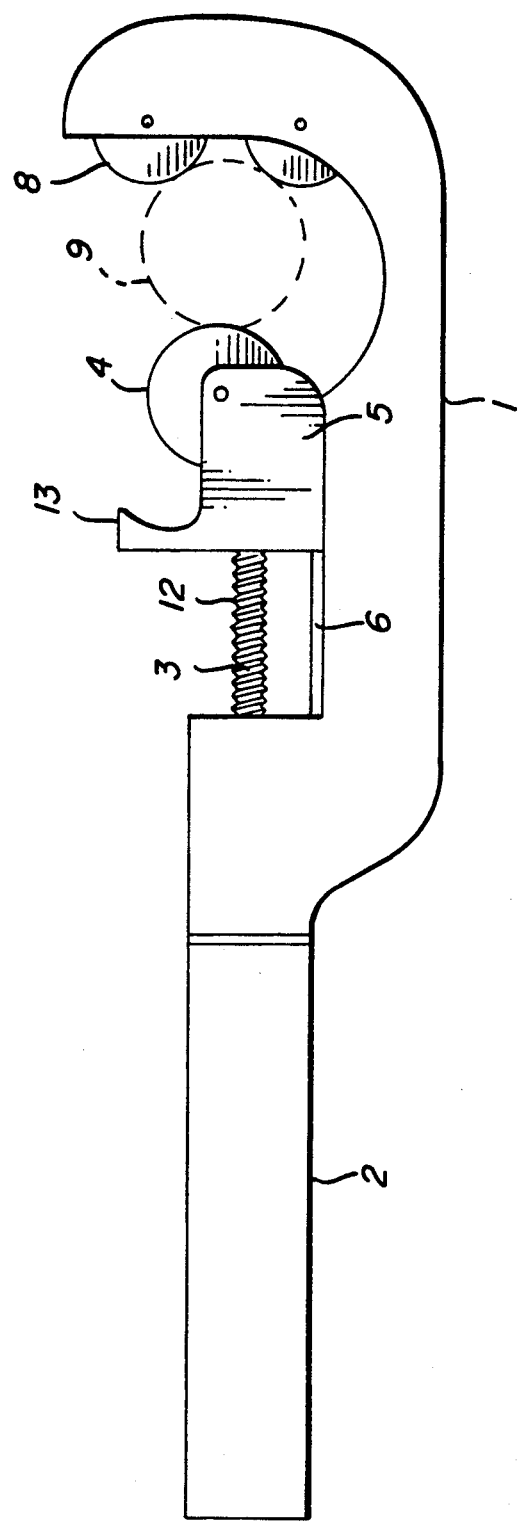
FIG. 5 is a view similar to that of FIG. 1 of a second embodiment of the invention.
Figure 6:
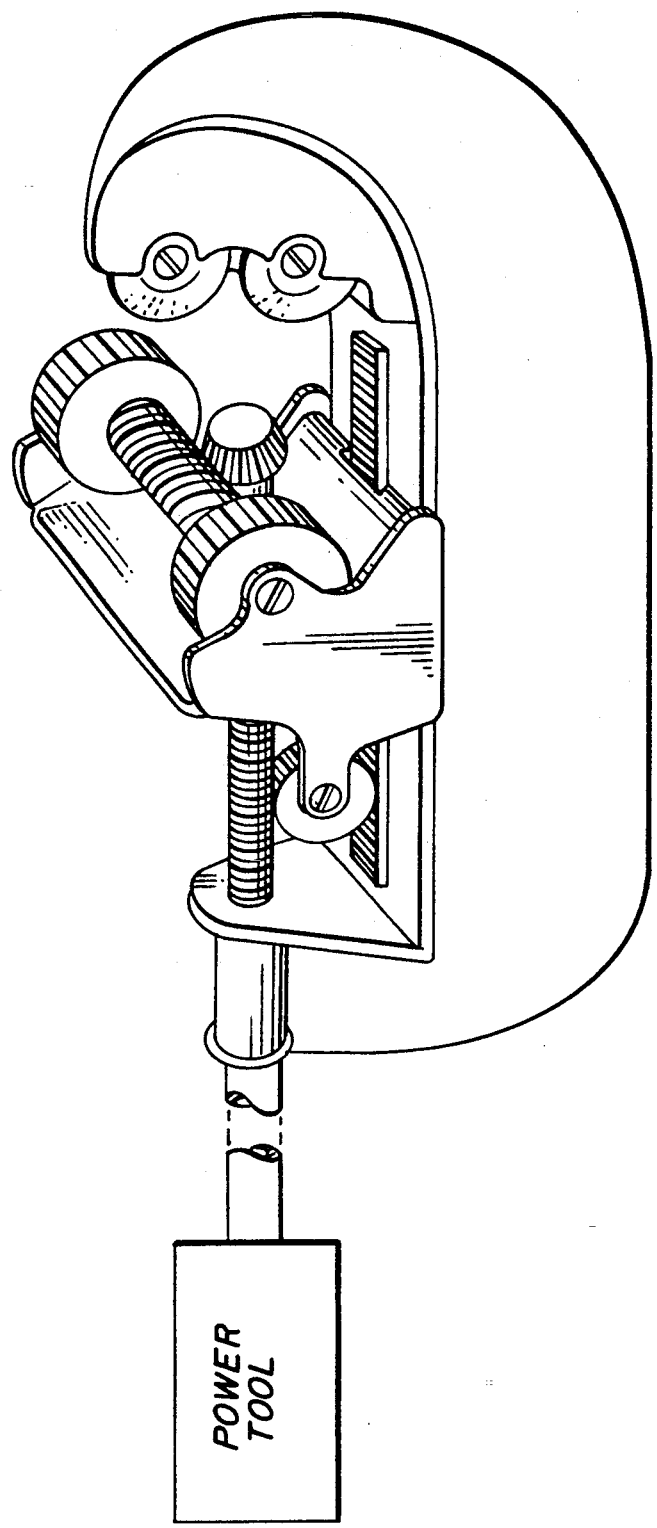
FIG. 6 is a perspective view of the device of the invention.

Instead of actively driving the carriage 5 with the motor, it is also possible to bias the same in a direction towards the cutting rollers 8 with a spring. A simple helically wound compression spring 12 is the preferred choice. With reference to FIG. 5, the carriage 5 is, in that embodiment, provided with a finger hook 13. The carriage 5 is pulled back, against the force of the spring 12, such that a pipe 9 can be introduced into the triangular space defined by the rollers 4 and 8. When the finger hook 13 is released, the power roller 4 will be forced against the pipe 9, which, in turn, will be clamped against the cutting rollers 8. At that point, the motor in the handle 2 may be started, which causes the pipe 9 to be rotated within the triangular space.

It is important in this invention that the power roller 4 is driven. The driving of the roller 4 causes the pipe 9 to rotate within the triangle. Due to the pushing force acting upon the carriage 5, the roller 4 forces the pipe 9 against the cutting rollers 8. The cutting rollers 8 thus cut and eventually sever the pipe 9. If the pipe 9 is held stationary, the pipe cutter may be released after the motor is turned on. It will then automatically rotate about the pipe until the pipe is severed.

In an alternative embodiment of the invention, only one cutting roller 8 is provided and two power rollers 4, mutually arranged in a triangle. Such a configuration is similar to that disclosed, for instance, in the above-mentioned patent to McDaniel. Of the two rollers 4, in that case, either both or only one may be power-driven.

It is understood that the motor with the handle may be removed from the device. This makes it possible to use one and the same power tool for several similar devices. In addition, in locations with restricted access (pipe close to the wall), it may be advisable to remove the motor and to manually rotate the cutting device about the pipe. Both the spring biased carriage and the power driven carriage embodiment will work manually.

I claim:

1. A device for cutting tubing and other cylindrical objects, comprising:
   a frame having a handle portion at one end thereof and an upper jaw portion at another end thereof;
   a cutting roller rotatably supported in said upper jaw portion;
   a slide carriage slidingly mounted on said frame;
   a power-driven roller rotatably supported in said slide carriage;
   said slide carriage with said power-driven roller forming a lower jaw disposed opposite from said upper jaw portion; said upper jaw portion and said lower jaw defining a cutting space therebetween for receiving tubing or other cylindrical materials to be cut;
   means for sliding said slide carriage in a direction towards said upper jaw portion for narrowing the cutting space during a cutting operation; and
   power means for driving said power-driven roller.

2. The device according to claim 1, including a third, rotatably mounted roller, said cutting roller, said power-driven roller and said third roller being mutually oppositely disposed in a triangular configuration and forming a triangular clamping space therebetween.

3. The device according to claim 2, wherein said third roller is a further cutting roller rotatably supported in said upper jaw portion.

4. The device according to claim 1, wherein said sliding means include a threaded spindle operatively connected to and rotatably driven by said power means and an extension with gear teeth formed on said slide carriage, said gear teeth meshing with said threaded spindle for advancing said slide carriage upon a rotation of said threaded spindle.

5. The device according to claim 1, wherein said sliding means include a spring biasing said slide carriage with said power-driven roller in a direction towards said cutting roller.

6. The device according to claim 1, wherein said power means include a motor disposed in said handle portion, a spindle operatively connected to and rotatably driven by said motor, a gear wheel rigidly connected to said power-driven roller meshing with gear teeth provided on said spindle.

7. The device according to claim 1, including means for allowing said cutting roller disposed in said upper jaw portion to resiliently retract upon a given force exerted thereon in a direction from said lower jaw.

8. A device for cutting tubing and other cylindrical objects, comprising a body; first and second jaw portions attached to said body and defining a cutting space therebetween for receiving tubing to be cut; said first jaw portion being rigidly connected to said body and said second jaw portion being slidingly supported on said body opposite said first jaw portion; a cutting roller rotatably supported in said first jaw portion; a power-driven roller rotatably supported in said second jaw portion; means for sliding said second jaw portion in a direction towards said first jaw portion for narrowing the cutting space during a cutting operation; and power means disposed in said body for driving said power-driven roller.

* * * * *